Dec. 5, 1961 W. C. BOYCE ET AL 3,011,739
THREE AXES SIDE CONTROLLER
Filed April 6, 1960 3 Sheets-Sheet 1

WILLIAM C. BOYCE
WILLIAM B. LUTON
JACK N. WOOD
INVENTORS.

BY T. H. Nichols

AGENT

Dec. 5, 1961 W. C. BOYCE ET AL 3,011,739
THREE AXES SIDE CONTROLLER
Filed April 6, 1960 3 Sheets-Sheet 2

WILLIAM C. BOYCE
WILLIAM B. LUTON
JACK N. WOOD
INVENTORS.

BY *T. K. Nichols*

AGENT

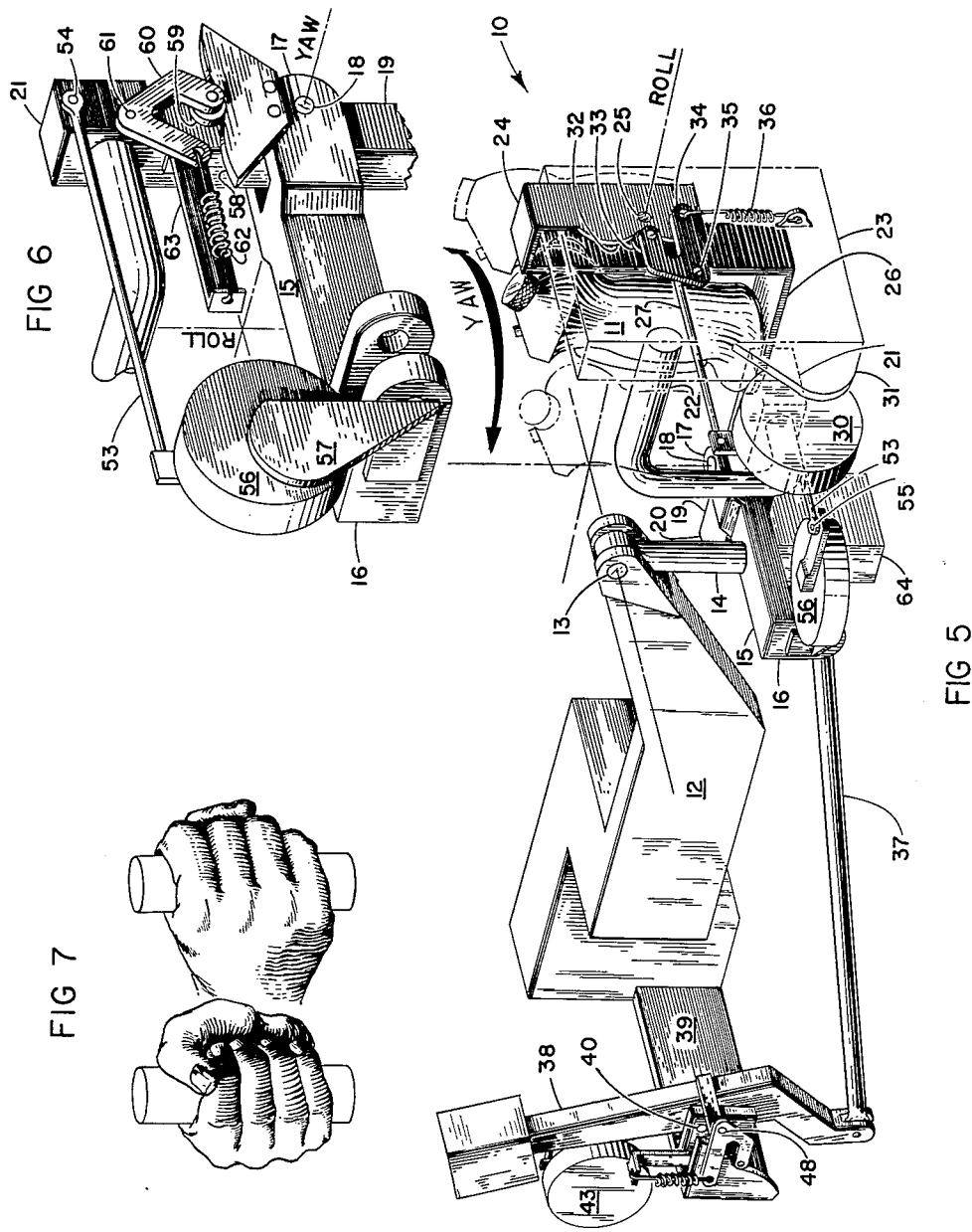

United States Patent Office 3,011,739
Patented Dec. 5, 1961

3,011,739
THREE AXES SIDE CONTROLLER
William C. Boyce, William B. Luton, and Jack N. Wood, Dallas, Tex., assignors to Chance Vought Corporation, a corporation of Delaware
Filed Apr. 6, 1960, Ser. No. 20,465
3 Claims. (Cl. 244—83)

This invention pertains to a new apparatus for controlling a vehicle, particularly one which operates under high accceleration loads.

More specifically this invention comprises a new apparatus for controlling a vehicle or more particularly a means for generating the three basic roll, pitch, and yaw signals comprising means operated by movements of the pilot's controlling hand about the wrist for controlling a signal generator i.e., movements of the hand about three axes intersecting in the middle of the wrist.

A great need has been in existence for replacing the old rudder pedals and center mounted stick or wheel for controlling an aircraft or space vehicle about its three axes of rotation, and yet, retaining the ability to have control of the vehicle about each of its axes, the control about each axis being either separate or in combination with each other.

With the advent of the space age and the imminence of sending man up in a controllable vehicle a need arose for a new concecpt of control input that would be useable under high "g" (gravity) loadings.

A primary object of this invention is therefore to provide a means for controlling a vehicle under high "g" loadings, particularly as when the pilot's arms are restrained along with the rest of the pilot's body and limbs for high "g" flight.

Another object of this invention is to provide a means for controlling a vehicle under high "g" loadings comprising means for rotating the pilot's hand about three axes of rotation, each of the three axes of rotation being parallel to the three respective roll, pitch, and yaw axes of the vehicle, and the three axes of hand rotation intersecting with each other in the middle of the pilot's wrist.

Another primary object of this invention is to provide at least one apparatus for carrying out the disclosed method for controlling a high "g" loaded vehicle in the form of a side controller for controlling the vehicle about all three axes of pitch, roll, and yaw movement wherein the side controller has a handgrip having three axes of movement in which each of the axes intersect with each other in the middle of the wrist of the controlling hand thereon so that little, if any, arm movement is required.

Another object of this invention is to provide a side controller with a handgrip having three axes of movement for controlling a vehicle by use of only one hand at the side of the body wherein the side controller is so balanced both statically and dynamically about each of its pivotal axes of rotation that acceleration forces of any magnitude and direction are prevented from causing inadvertent inputs in the control system.

A further object of this invention is to provide a side controller for controlling a vehicle about all three axes of movement in which the side controller has artificial feel, i.e., force gradients required to provide the pilot with desirable feedbacks responsive to handgrip position, velocity, and acceleration.

Other objects and various advantages of the disclosed method and at least one controller for carrying out the method will be apparent from the following detailed description, together with the accompanying drawings, submitted for purposes of illustration only and not intended to define the scope of the invention, reference being had for that purpose to the subjoined claims.

Briefly, this invention pertains to a method for controlling a vehicle, particularly under high "g" loads, comprising controlling the vehicle in roll by rotating the controlling hand about an axis parallel to the roll axis of the vehicle, controlling in pitch by rotating the controlling hand about an axis parallel to the pitch axis of the vehicle, and controlling in yaw by rotating the controlling hand about an axis parallel to the yaw axis of the vehicle, each of the three axes about which the hand rotates intersecting in the middle of the wrist. An exemplary device for carrying out the method comprises a three axes side controller having a handgrip pivotally mounted so that its three axes of movement are parallel to the three axes of movement of the controlled vehicle, each of the three handgrip axes passing through and intersecting in the wrist of the controlling hand while positioned on the handgrip. Further the side controller is mass balanced, statically and dynamically, about each of the axes of rotation for the prevention of "g" loadings from causing inadvertent inputs in the control system, and has artificial feel to provide the pilot with desirable feedbacks responsive to handgrip position, velocity, and acceleration.

The drawings diagrammatically illustrate by way of example, not by way of limitation, one form of the invention where like reference numerals designate corresponding parts in the several views in which:

FIG. 5 is a perspective view looking aft and inboard of the side controller and showing in phantom a rotation of the handgrip about its yaw axis;

FIG. 6 is a perspective view of the bottom looking inboard and rearwardly of the handgrip and of the yaw feel portion; and FIG. 7 is a schematic perspective view representing the hand movements required to produce a yaw signal.

The invention disclosed herein is not limited in its application to the method and details of construction and arrangement of parts shown and described, since the invention is capable of other embodiments and of being practiced or carried out in various other ways. Also it is to be understood that the phraseology and terminology employed herein is for the purpose of description and not of limitation.

The method disclosed provides control with only one hand of a vehicle, such as a space vehicle or an airborne vehicle as a conventional aircraft. Since with the disclosed method, control may be effected with only movements of the hand, this method is very suitable for use in aircraft or space vehicles wherein the pilot's body including his arms are restrained or strapped down in a practically immovable condition as required for high "g" flights.

The disclosed method comprises controlling the vehicle about the three roll, pitch, and yaw axes of rotation of the vehicle by rotating the hand on a control handgrip or signal generator about an axis thru the center of the wrist and parallel to the vehicle roll axis for roll control, by rotating the hand on the handgrip about an axis thru the center of the wrist and parallel to the vehicular pitch axis for pitch control, and by rotating the hand on the handgrip about an axis thru the center of the wrist and parallel to the vehicular yaw axis for yaw control. Accordingly, only the hand need be free to move about its wrist for full control of a vehicle.

Figure 2:
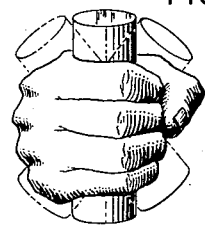
FIG. 2 is a schematic perspective view representing the hand movements, with parts shown in phantom, required to produce a roll signal.
Figure 4:
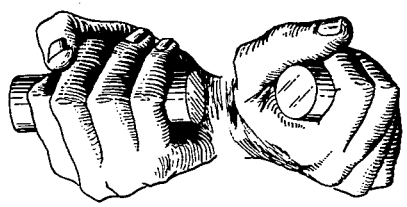
FIG. 4 is a schematic perspective view representing the hand movements required to produce a pitch signal.

FIGS. 2, 4, and 7 disclose the controlling hand movements required for the method and required for all controllers carrying out the method.

While various control devices may be utilized to perform the above described method and while the inventors have invented several embodiments, FIGS. 1, 3, 5, and 6 disclose one of the preferred embodiments for carrying out the method.

Three axes mounting

Figure 1:
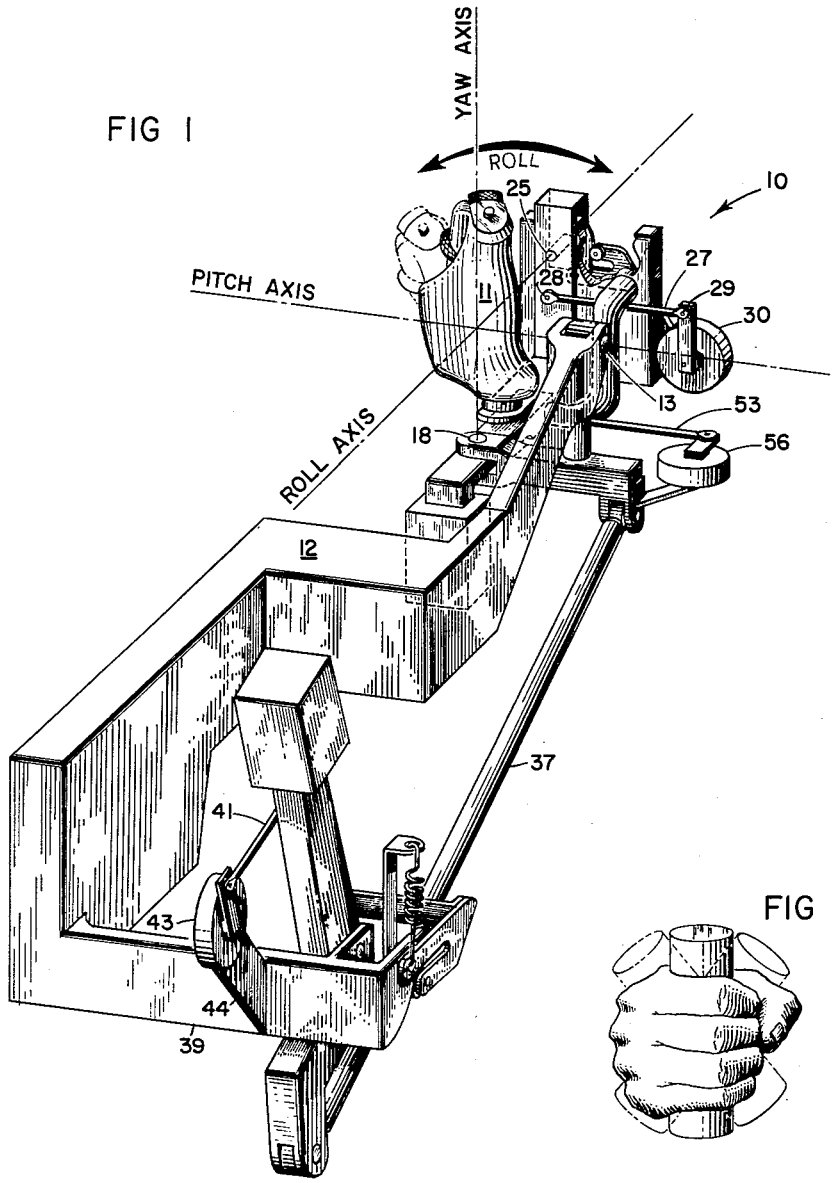
FIG. 1 is a perspective view looking forward of the three axes side controller showing the intersection of the three axes of rotation of the side controller handgrip and particularly showing in phantom a rotation of the handgrip about its roll axis.
Figure 3:
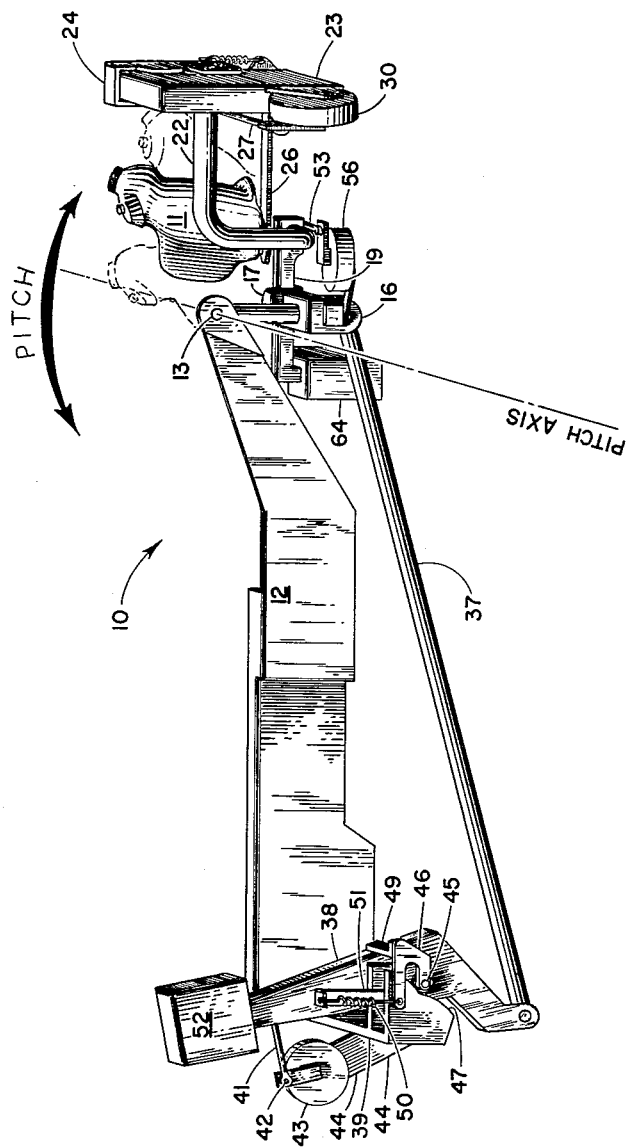
FIG. 3 is a perspective view of the side controller looking inboard and particularly showing in phantom a rotation of the handgrip about its pitch axis.

The preferred mechanism comprises a controller 10 mounted on the vehicle near one side of the occupant's or pilot's cockpit so that he may place his hand comfortably on a handgrip or signal generator 11 for rotation about three axes as explained hereinafter. A main structural member 12, FIGS. 1, 3, and 5, is fixedly secured to the vehicle to be controlled by any suitable manner. An adjustable channel shaped arm rest (not shown) with restraining means, such as straps thereon for fastening the arm down, as for use in high acceleration vehicles as space vehicles may be secured on top of the main structural member for supporting the arm, preferably the right arm, from the elbow to the wrist whereby the hand is free to rotate in the three directions illustrated in FIGS. 2, 4, and 7 even though the arm may be restrained. Because this controller is designed for being positioned to one side of the operator or pilot on one side of the cockpit, it is referred to as a side controller hereinafter.

A pin 13 pivotally connects the upper end of a movable member comprising a vertical member 14 and a transverse member 15 to the forward end of structural member 12. The vertical member 14 is fixedly secured to the transverse member 15 intermediate the bifurcated ends 16 and 17 of the transverse member. The pitch axis of the side controller is parallel to the vehicular pitch axis and is defined by the pivot pin 13.

A pin 18, FIGS. 5 and 6 particularly, pivotally connects the bifurcated end 17 to a longitudinally extending second movable member 19 intermediate the ends 20 and 21 of the longitudinal member. The yaw axis of the side controller is defined by pivot pin 18 which is parallel to the yaw axis of the vehicle. One end of a rigid curved bar 22, shown round in shape is fixedly attached to the longitudinal member end 21 and extends transversely, then upwardly, and then forwardly to terminate in block 23, to which the other end of the round bar is fixedly attached. An inverted U-shaped movable member 24 is pivotally connected to block 23 by axially extending pivot pin 25 and has a rearward extension 26 for rigidly supporting the handgrip 11. The roll axis is defined by the pivot pin 25 and which axis is parallel to the vehicular roll axis. Accordingly, the handgrip may be rotated about the pivot pin 25 or roll axis, rotated about the pivot pin 13 or pitch axis, or rotated about the pivot pin 18 or yaw axis, or rotated about any two or even all three axes simultaneously. On each pivot, the handgrip rotates in either direction from a center or neutral position.

While the method and the exemplary handgrip are described herein with the handgrip preferably positioned with its roll, pitch, and yaw axes aligned parallel to the roll, pitch, and yaw axes of the vehicle, the handgrip may, as a consequence of its function in the cockpit be aligned differently.

For purposes of simplification of the control of aircraft, the exemplary control handgrip is mounted so as to cause the aircraft to move in the direction of movement of the handgrip. Operation of the control surfaces, reaction jets, or other control means may be accomplished with servomotors governed by the output signals from proportional type signal generating means operated by the three basic control push-pull rods, 27, 41, and 53 of the handgrip.

The three roll, pitch, and yaw axes intersect at a point in the middle of the wrist of a hand on the handgrip and aft of the center of the handgrip by a distance equal to the distance from the center of an average fist to the wrist. This distance is approximately two and a half inches for men from five to ninety five percentile, noting the WADC Technical Report 52—321, "Anthropometry of Flying Personnel." In a handgrip designed for very small hands or very large hands in place of the average hand, the point of intersection of the three axes of the handgrip to be within the wrist will accordingly lie well within the range of from one inch to five inches rearwardly of the center of the handgrip.

Roll control

A transversely movable push-pull roll rod 27 is pivotally connected at one end with a pin 28, FIG. 1, to the U-shaped member 24 offset from the pivot 25 of the member so that translation of the rod in either direction results from pivotal movement in either direction, respectively, of the handgrip about its roll axis. Roll rod 27 for generating a roll signal is connected at its other end either directly to the control linkage or to a conventional signal relaying device to transmit a roll signal responsive to rotation of the handgrip about its roll axis. While various types of relay devices may be utilized, depending upon the requirements of the control system of the vehicle, the preferred means is a proportional type signal means, as a potentiometer, for controlling servomotors for operating roll control means such as conventional control surfaces or roll reaction jets on the vehicle. Accordingly, push-pull rod 27 is illustrated pivotally connected by pin 29 to potentiometer 30. A flange 31, FIG. 5, extends from block 23 for fixedly supporting the potentiometer 30 relative to the handgrip roll axis pivot pin 25 when the handgrip is rotated about its roll axis. Accordingly, a rotation of the handgrip 11 about its pivot pin 25 or its roll axis in either direction as shown in FIG. 1, generates a roll signal for control of the vehicle about its longitudinal or roll axis.

Artificial roll feel

While the disclosed side controller signal output push-pull rod 27 may be connected or linked directly to a control system having a feedback of forces in proportion to the amount of displacement of the handgrip, in other types of control systems where forces do not feed back in the system as a "fly-by-wire" type, the pilot has no way of feeling the aerodynamic pressure on the control surfaces or the amount of turning force being applied due to an input by him. Therefore, it is very desirable to provide the pilot with a means for relating to him the amount of control signal being generated. This is done here with a combination cam and spring arrangement and dampers. The cam 32 comprising two allochiral curves from a center position is an appendage of the U-shaped member 24 for receiving a cam follower 33. A lever 34 for carrying the cam follower 33 is pivotally mounted by pivot pin 35 on the block 23 shown in phantom on FIG. 5, and the cam follower is spring loaded on the cam because of a tension spring 36 connected between the lever and the block. Therefore any rotation of the handgrip about pivot pin 25 on its roll axis from a neutral or center position rotates the cam 32 to raise the spring loaded cam follower 33 from its centered position on the cam to increase the tension in spring 36, as illustrated in FIG. 5. As the handgrip is rotated farther and farther the cam follower rides higher on the cam 32 causing an increase in the spring tension, the spring force peaking when the handgrip has turned until it abuts against stops (not shown) at its maximum output positions. The feel force gradient can be varied by changing the shape of the cam and/or by changing the spring tension and/or spring rate, and/or damping characteristics.

Roll axis balance and damping

Both the entire U-shaped member and the handgrip are statically and dynamically balanced, additional weights being added if required, about the pivot pin 25 to provide balance of the side controller about its roll axis under any magnitude and direction of acceleration forces on the vehicle as well as the side controller.

A rotary roll damper (not shown) is positioned internally of block 23 and connected between the block and member 24 at the pivot pin connection 25 for providing damping of the movements of the handgrip about its roll axis. Any suitable conventional viscous, friction, or eddy current damper may be utilized, such as but not limited to an eddy current damper similar to one of the 1042 series manufactured by Lydon Aircraft Inc. of Newark, New Jersey.

Accordingly, the three component parts of the roll feel system are disclosed as the cam 32, cam follower 33, and spring 36 for providing the force of rotating the handgrip versus the displacement of the handgrip from its center position; the roll damper for providing the force vs. velocity; and the handgrip being balanced or inertia damped about its roll pivot 25 for providing the force vs. acceleration.

Pitch control

A longitudinal movable push-pull pitch rod 37, FIGS. 3 and 5, is pivotally connected between the bifurcated end 16 of the transverse member 15 described above and the bifurcated lower end of a lever 38. Translation of the pitch rod in either direction results from pivotal movement in the respective directions (as shown in FIG. 4) of the handgrip about its pitch axis 13. The lever 38 is pivotally mounted on a transverse portion 39 of the main structural member 12 with pin 40, FIG. 5, for moving a second push-pull rod 41, FIG. 3, the forward end of the second rod being pivotally connected to the upper end of lever 38 and the rearward end of the second rod being pivotally connected by pin 42 to a pitch signal generating means, as potentiometer 43, for controlling servomotors for operation of pitch control means such as control surfaces on the vehicle (not shown). Potentiometer 43 is fixedly mounted on flange 44 on the member transverse portion 39. Accordingly, a rotation in either direction of handgrip 11 about its pivot pin 13 or its pitch axis as shown in FIG. 3, generates a pitch signal for control of the vehicle about its transverse or pitch axis.

Further, the pivot 13 is positioned so that the controller pitch axis intersects the controller roll axis at a point approximately two and one half inches aft of the center of the handgrip.

Artificial pitch feel

FIG. 3 discloses the artificial feel mechanism for producing a force on the pivotal handgrip proportional to displacement of the handgrip from its center position. A cam follower 45 is rotatably mounted on lever 46 for rotation on cam surface 47 comprising two allochiral curves from a center position and appendaged to the transverse portion 39. Lever 46 is pivotally mounted with pin 48, FIG. 5 on a flange 49, FIG. 3, fixed to the lever 38. A tension spring 50 connected between the cam follower lever 46 and a flange 51 fixedly secured to the transverse portion 39 spring loads the cam follower on the cam surface. Accordingly, any rotation of the handgrip about its pitch axis from the center position rotates the cam follower lever 46 to raise the spring loaded cam follower 45 from its centered position on the cam illustrated in FIG. 3.

Pitch axis balance and damping

A weight 52 is adjustably secured to lever 38 for statically and dynamically balancing the side controller about its pitch axis or the pivot pin 13, whereby any magnitude and direction of acceleration forces on the vehicle as well as the side controller are balanced out completely.

A rotary pitch damper (not shown) similar to the roll damper is positioned internally of lever 38 and connected between the lever and the supporting flange from the transverse portion 39 at pivot pin connection 40 for providing damping of the movements of the handgrip about its pitch axis.

Accordingly, the three component parts of the pitch feel system are disclosed as: the cam 47, cam follower 45, and spring 50 for providing the force vs. displacement of the handgrip; the pitch damper for providing the force vs. velocity of the handgrip; and the inertial damper 52 for providing the force vs. acceleration of the handgrip.

Yaw control

A transverse movable push-pull yaw rod 53, FIGS. 5 and 6, is pivotally connected at one end with pin 54, as shown in the bottom view of FIG. 6, to the end 21, FIGS. 5 and 6, of longitudinal extending lever 19 which is rotatable about pivot 18 so that translation of the rod as shown in FIG. 5 in either direction results from pivotal movement in either direction, as shown in FIG. 7 of the handgrip about its yaw axis. Yaw rod 53 is pivotally connected at its other end with pin 55 to a yaw signal generating means, as potentiometer 56, for controlling servomotors for providing yaw control of the vehicle as by operation of the vehicular yaw control means such as surfaces. Potentiometer 56 is fixedly secured to the end 16 of transverse member 15 by flange 57, FIG. 6. Accordingly, a rotation in either direction of the handgrip 11 about its pivot pin 18 or its yaw axis as shown in FIG. 5, generates a yaw signal for control of the vehicle about its vertical or yaw axis.

Likewise, the pivot 18 is so positioned that the controller yaw axis intersects the controller roll axis at the same point, approximately two and one half inches aft of the center of the handgrip, that the controller pitch axis intersects the controller roll axis. Thus, the three roll, pitch, and yaw controller axes intersect in the center of the wrist of the hand on the handgrip.

Artificial yaw feel

FIGS. 5 and 6 disclose the artificial feel device for producing forces on the pivotal handgrip proportional to the displacement of the handgrip similar to the artificial pitch feel spring loaded cam mechanism. A cam surface 58 comprising two allochiral curves from a center position and forming an appendage to the end 17 of the transverse member 15 receives a cam follower 59. This cam follower is carried by lever 60 which is pivotally mounted with pin 61 on the end 21 of longitudinal extending lever 19. The cam follower lever 60 is spring loaded on the cam with tension spring 62 connected between the lever and a flange 63 fixedly secured to the longitudinal extending lever 19. Accordingly, any rotation of the handgrip about its yaw axis from a neutral or center position rotates the cam follower lever 60 to raise the spring loaded cam follower 59 from its central position on the cam illustrated in FIG. 6.

Yaw axis balance and damping

A weight 64, FIG. 5 is secured to the rearward end 20 of longitudinally extending and pivotally supported lever 19 for statically and dynamically balancing the handgrip and its linkage about the controller yaw axis or pivot pin 18 whereby any magnitude and direction of acceleration forces on the vehicle as well as the side controller are balanced out completely.

A rotary yaw damper (not shown) likewise similar to the roll damper is positioned internally of lever 19 and connected between the lever and the end 17 of lever 15 at pivot pin connection 18 between the two levers for providing damping of the movements of the handgrip about its yaw axis.

Accordingly, the three component parts of the yaw feel system are disclosed as: the cam 58, cam follower 59, and spring 62 for providing the force vs. displacement of the handgrip; the yaw damper for providing the force vs. velocity of the handgrip; and the inertia damper 64 for providing the force vs. acceleration of the handgrip.

While symmetrical cams are described and illustrated, obviously the cams may be asymmetrical if so desired.

The handgrip is equipped with roll and pitch trim wheels as disclosed in United States Patent Re. 24,701, a reissue of Patent No. 2,787,746.

In summary a new method is disclosed for controlling a vehicle under high "g" loadings with only one free hand about the three basic roll, pitch, and yaw vehicular axes comprising moving the hand, when placed on a signal generator, about three axes intersecting in the middle of the wrist, each of the wrist axes being parallel to a vehicular axis. At least one apparatus in the form of a side controller has been disclosed for carrying out the above method comprising a handgrip pivotally mounted to rotate about three axes, these three axes intersecting approximately two and one half inches aft of the center of the handgrip.

In addition the exemplary embodiment is mass balanced for the prevention of "g" loadings from causing inadvertent inputs in the control system, and the exemplary embodiment has artificial feel to simulate force gradients applied to the handgrip as a function of displacement, velocity, and acceleration of the handgrip.

We claim:

1. A three axes side controller for generating signals to control a vehicle about its roll, pitch and yaw axes comprising: a fixed member adapted to support the forearm of the vehicle operator; a first movable member pivoted to said fixed member for movement in a first plane about an axis of rotation parallel to the vehicular pitch axis; a second movable member pivoted to said first movable member for movement in a second plane about an axis of rotation parallel to the vehicular yaw axis; a third movable member pivoted to said second movable member for movement in a third plane about an axis of rotation parallel to the vehicular roll axis; a handgrip mounted on said third movable member adapted to be grasped by the hand of the vehicle operator and to be manually moved from a neutral position for controlling the movement of all three movable members; and proportional type signal generating means connected to each of said movable members and governed by movement of said movable members; the intersection of the three axes of rotation being aft of said handgrip.

2. A side controller as recited in claim 1 wherein the intersection of the three axes of rotation is at a point between two and five inches rearwardly of said handgrip.

3. A side controller as recited in claim 1 wherein the intersection of the three axes of rotation is aft of said handgrip at the approximate location of the wrist of the vehicle operator.

References Cited in the file of this patent

UNITED STATES PATENTS

| | | |
|---|---|---|
| 2,144,616 | Carlson | Jan. 24, 1939 |
| 2,470,968 | Aske | May 24, 1949 |
| 2,684,215 | Ashkenas | July 20, 1954 |
| 2,945,648 | Oplinger | July 19, 1960 |